United States Patent [19]
Ban

[11] Patent Number: 6,118,867
[45] Date of Patent: Sep. 12, 2000

[54] TRAY FOR AUTOMATIC DIAL TELEPHONES

[75] Inventor: Chae-Il Ban, Inchen, Rep. of Korea

[73] Assignee: Chang-EI Communications Co. Ltd., Seoul, Rep. of Korea

[21] Appl. No.: 09/041,490

[22] Filed: Mar. 12, 1998

[30] Foreign Application Priority Data

Apr. 18, 1997 [KR] Rep. of Korea .......................... 97-8502
Feb. 13, 1998 [KR] Rep. of Korea .......................... 98-4302

[51] Int. Cl.[7] ...................................................... H04M 1/00
[52] U.S. Cl. ............................................. 379/355; 379/456
[58] Field of Search .................................... 379/352–357, 379/110.01, 100.14, 428, 434, 441, 456

[56] References Cited

U.S. PATENT DOCUMENTS

| | | | |
|---|---|---|---|
| 3,705,960 | 12/1972 | Evans et al. ............................... | 379/356 |
| 4,941,172 | 7/1990 | Winebaum et al. ....................... | 379/355 |
| 4,985,918 | 1/1991 | Tanaka et al. ............................ | 379/356 |

*Primary Examiner*—Wing F. Chan
*Attorney, Agent, or Firm*—Auslander & Thomas

[57] ABSTRACT

A tray for automatic dial telephones has a construction that lots of specific telephone numbers are stored in its internal memory, and when a preselected switch is turned "ON" a dial tone of telephone number that we are dialing is outputted through the speaker. After one of button switches is turned "ON" to output a dial tone of telephone number stored in the internal memory, it is activated for a short period of time by being initialized through a return signal, thereby using the tray economically. In addition, an external telephone line and a telephone's telephone line are respectively connected to a telephone tray main body, so that when a telephone number is selected, the dial tone of telephone number stored in the memory is simultaneously outputted via the external telephone line and the telephone's telephone line, by telephone line's power value increasing/decreasing method. In this connection, there is no need to use a separate power source and pick up the handset, in order to output the dial tone of specific telephone number.

3 Claims, 5 Drawing Sheets

TRAY FOR AUTOMATIC DIAL TELEPHONES

BACKGROUND OF THE INVENTION

1. Field of the Invention

The present invention relates to a promotional tray for automatic dial telephones. More particularly, it relates to a tray for automatic dial telephones, which can make a plurality of button switches turned "ON" selectively, with a handset disposed beside speaker holes, so as to output a dial tone of a telephone number that we wish to dial, simultaneously performing the function of supporting a telephone set.

A prior arts of tray for automatic dial telephone may be found, for example in a United States Pat. No. D284,470 and D292,921.

2. Discussion of Related Art

It is well-known that nowadays, an advertisement plays an important part in every business enterprise's outgoing publicity.

In this connection, such promotional telephone trays serve as business enterprise's public relations, and plenty of sales network and custom assurances. The enterprise's logogram, telephone number, etc. appear on the surface of conventional telephone tray, for advertisement, but they are removed from the surface with long-term use.

In addition, the conventional telephone tray suffers a disadvantage, in that we have to confirm and then dial the telephone number printed on the surface of trays, in order to telephone to the enterprise that advertises through the telephone tray.

SUMMARY OF THE INVENTION

Accordingly, the present invention is directed to a tray for automatic dial telephones that substantially obviates one or more of the problems due to limitations and disadvantages of the related art.

An object of the present invention is to provide a tray for automatic dial telephones, which stores a dial tone of a specific telephone number, before outputting it via a transmitter of the telephone in accordance with user's operation.

Another object of the present invention is to provide an economical tray for automatic dial telephones, in which a battery power is supplied for a short period of time, making button switches turned "ON" with a handset beside speaker holes.

Still another object of the present invention is to provide a tray for automatic dial telephones, which outputs a dial tone of specific telephone number via a direct-connected telephone and an external telephone, by turning on ten keys in response to the specific telephone, without picking up a handset.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the tray includes: a main body to put a telephone set thereon; a dial tone unit for storing a dial tone of a specific telephone number as an electrical signal; a battery for supplying an operational power of the dial tone unit; and a speaker for converting the electrical signal of the dial tone unit into a sound, before outputting it through a transmitter according to user's operation.

A battery power is applied to a reset terminal of a microprocessor through a reset unit, and simultaneously coupled to a transverse node of the microprocessor and button switches via a switching unit and diodes. Longitudinal nodes of the button switch are grounded by means of resistor, simultaneously connected to the microprocessor, passing through a diode, to make one of button switches turned "ON". Consequently, an output of an output terminal is transmitted to an input terminal, simultaneously converted into a fine voltage, a dial tone of telephone number stored in an internal memory is outputted via the speaker after passing by an amplifier, and a return unit is turned "ON" by a return signal outputted from the microprocessor, making the amplifier activated for a short period of time, before initializing it. In the result, the tray can be economically used by activating the button switches for a short period of time without a separate on/off switch.

The main body is connected to an external telephone line and a telephone line of telephone. An alternating current (AC) voltage transmitted through the external telephone line is, by a rectifier, converted into a direct current (DC) voltage, before detecting a high voltage state via a high voltage detector. When the DC voltage is not a high voltage, a voltage amplified in a low voltage amplifier is supplied as an operational power, after passing through the switching unit. A digital signal of telephone number stored in a memory according to a state in which the ten keys are turned "ON", passes through a signal generator, and is then applied to an output amplifier, causing the value of DC voltage of external telephone line to change. In result, the voltage value in response to dial tone is simultaneously outputted through two telephone lines. Thus, there is no need to use the battery and pick up the handset, in order to output the dial tone of specific telephone number via the direct-connected telephone and external telephone, by turning on the ten keys corresponding to the specific telephone.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENT

Reference will now be made in detail to the preferred embodiments of the present invention, examples of which are illustrated in the accompanying drawings.

Figure 1:
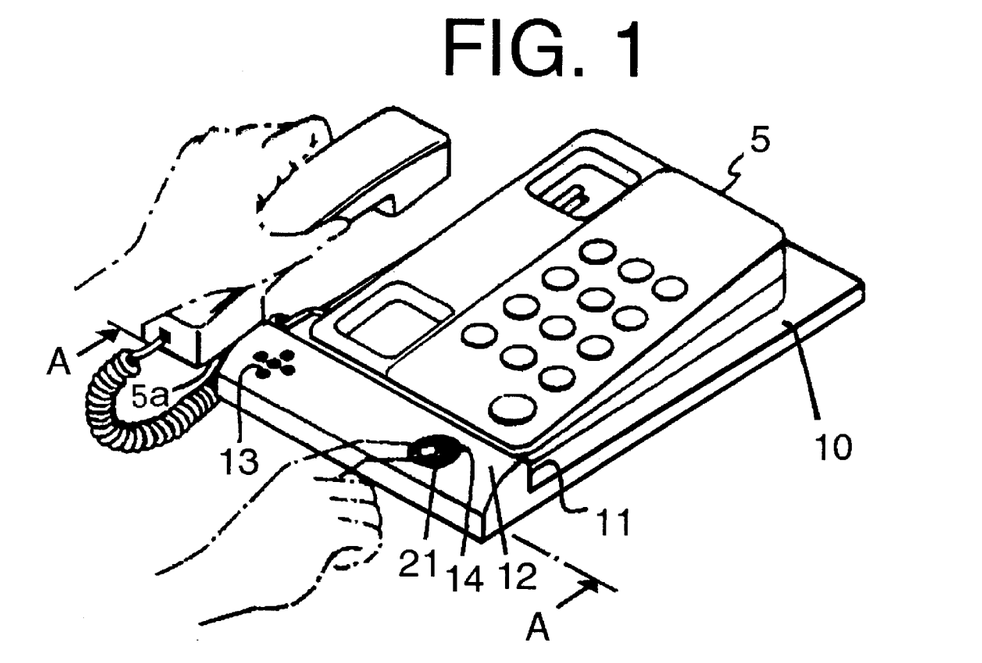
FIG. 1 is a perspective view of a telephone tray according to an embodiment of the present invention.
Figure 2:
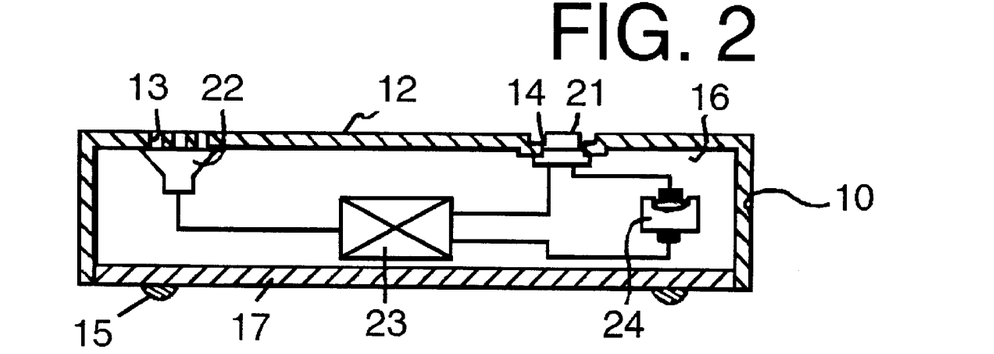
FIG. 2 is a schematic, cross-sectional view as taken along the line A—A of FIG. 1.

FIGS. 1 and 2 illustrate constructions according to an embodiment of the present invention. As shown in the figures, there are a raised spot 11 and a tilt projection 12 at a front portion of a telephone tray main body 10, and a telephone set 5 is laid on a rear portion of main body 10.

A button switch 21 is mounted in a switch reception aperture 14 formed at one side of tilt projection 12's top, while a speaker 22 is positioned inside of speaker holes 13 formed at the other side of tilt projection 12's top, for outputting a dial tone to a handset 5a of telephone set 5.

At a lower portion of an internal space 16 of main body 10 is formed a bottom plate 17 with a number of rubber feet 15.

A dial tone unit 23 provided in the internal space 16, is given a power current from a battery 24 which is electrically connected to the button switch 21, and its output terminal is connected with the speaker 22.

The speaker 22 and the button switch 21 are installed in the main body 10 through the internal space 16, before the dial tone unit 23 and the battery 24 are disposed in the internal space 16, being electrically connected with each other. Thereafter, the bottom plate 17 is fitted to the lower portion of the internal space 16.

The dial tone unit 23 preferably comprises a melody integrated circuit (for example, DTMF IC) where a dial tone signal is stored.

The following description relates to the operation effect of the embodiment of the present invention as constructed above.

The promotional telephone tray according to the present invention is usually adapted for supporting the telephone set 5, like a conventional telephone tray.

User makes a phone call to a specific enterprise that stores its telephone number for advertisement through the telephone tray, in the same way as the electronic pocket notebook, namely a dial tone is generated to be outputted to the transmitter 5a, for dialing via a telephone line.

That is to say, in case we intend to call to a designated enterprise via the telephone tray of the present invention, the handset 5a of telephone set 5 is picked up to neighbor to the speaker 22 mounted on the tilt projection 12 of main body 10, before the dial tone in response to the specified telephone number stored in the dial tone unit 23 is outputted through the transmitter 5a of telephone 5, by pushing the button switch 21, for switching the power to "ON".

After the dial tone transmitted to the transmitter 5a is converted into an electrical signal, it is treated in internal circuits of the telephone 5, to be dialed toward telephone line.

It is to be understood that the button switch 21 may be larger in number, and the dial tones corresponding to plural telephone numbers are stored in the dial tone unit 23, such that different dial tones are generated in accordance with operations of the respective button switches 21.

Figure 3:
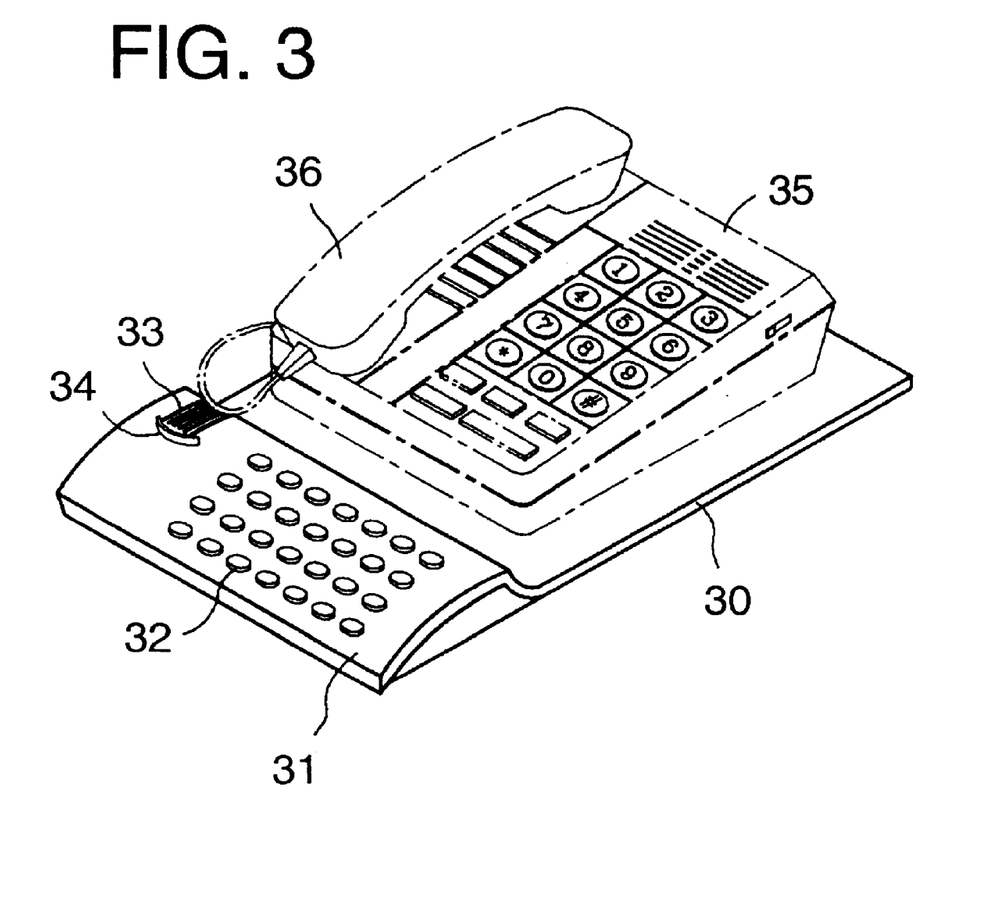
FIG. 3 is a perspective view of the telephone tray according to another embodiment of the present invention.
Figure 4:
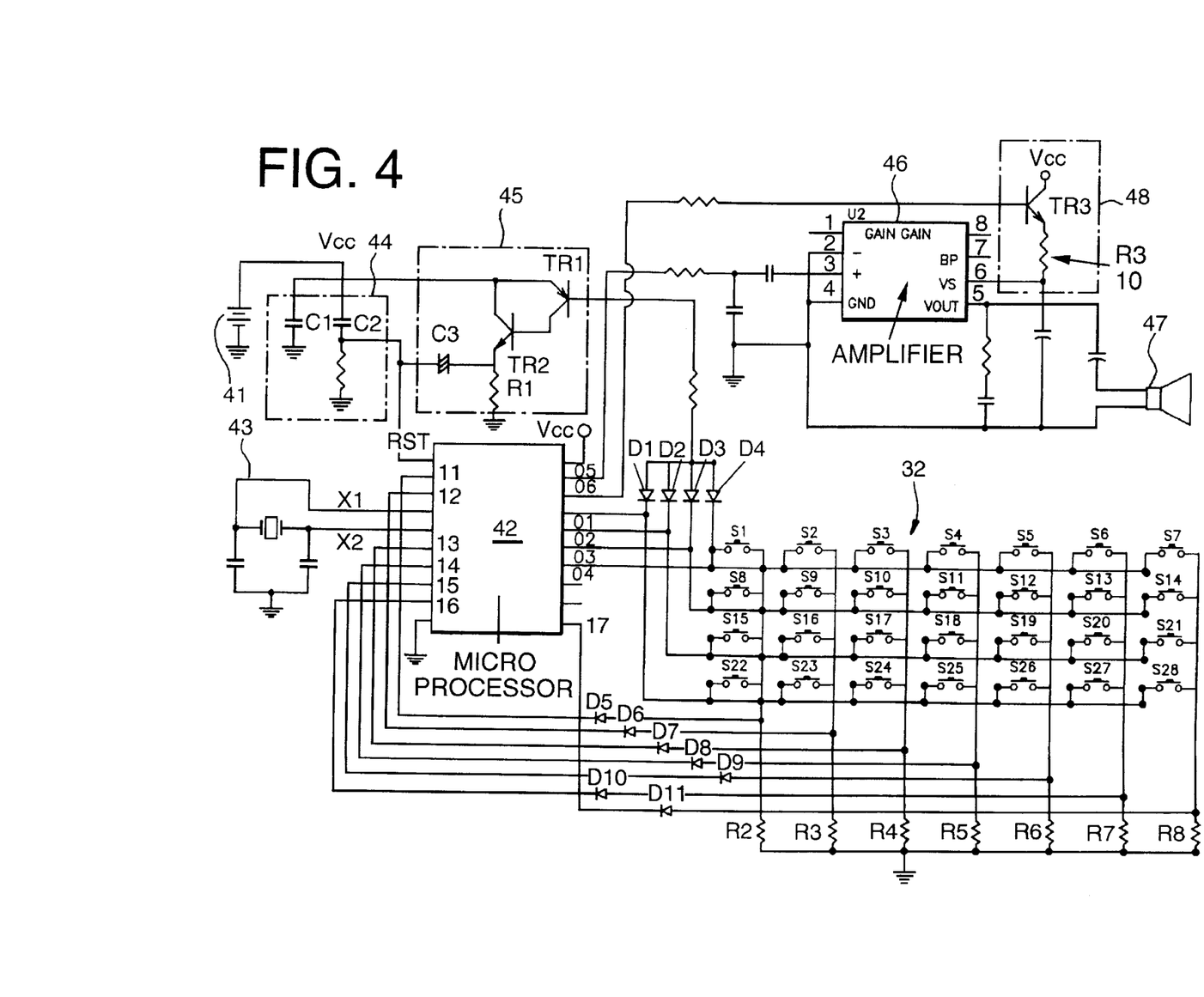
FIG. 4 is a circuit diagram showing the internal construction of FIG. 3.

With reference to FIGS. 3 and 4 showing constructions according to another embodiment of the present invention, a key input unit 32 where a plurality of button switches are in matrix arrangement, is mounted at one side of tilt projection 31's top formed at a front portion of main body 30.

A speaker hole 33 is formed at the other side of tilt projection 31's top, and a guider 34 is provided below the speaker hole 33.

A battery power Vcc given by a battery 41 is applied, as an operational power, to internal units including a microprocessor 42. The microprocessor 42 is given a clock by an oscillator 43, to make a specified cycle of operation. The microprocessor 42 having a memory and DTMF module therein, stores telephone numbers, and outputs dial tones corresponding to the telephone numbers.

The battery power Vcc is supplied to a reset terminal RST of microprocessor 42 via condensers C1 and C2 and a reset unit 44 of a resistor R1.

A switching unit 45 includes a first transistor TR1 having an emitter to which the battery power Vcc is applied, a second transistor TR2 having a base connected to a collector of first transistor TR1 and a collector to which battery power is applied, and a condenser C3 connected to the reset terminal RST of microprocessor 42.

Output terminals O1 O4 of microprocessor 42 are commonly connected to the base of transistor TR2 of switching unit 45 through reverse current prevention diodes D1 D4. The output terminals O1 O4 are connected to transverse nodes of button switches S1 S7 S8 S14 S15 S21 S22 S28 of key input unit 32, respectively.

Longitudinal nodes of button switches S1 S7 S8 S14 S15 S21 S22 S28 are grounded via resistors R2 R8, simultaneously passing through reverse current prevention diodes D5 D11, before connected to input terminals 11 17 of microprocessor 42. When one of button switches S1 S7 S8 S14 S15 S21 S22 S28 is turned "ON", one of output terminals O1 O4 of microprocessor 42, "H" is converted into a fine voltage "L", and transmitted to one of input terminals 11 17 through longitudinal row.

Telephone numbers which are stored in the store area of internal memory of microprocessor 42, selected by button switches S1 S28, are outputted as dial tone by DTMF module, and outputted through speaker 47 disposed inside of speaker holes, after passing by an amplifier 46.

A third transistor TR3 of a return unit 48 is turned "ON" by a return signal outputted from an output terminal O5 of microprocessor 42. The amplifier 46 is activated for a short period of time after turning on the button switches, and then outputs the dial tone before initialized.

The telephone tray according to another embodiment of the present invention has a construction that the power supplied from the battery 41 of main body 30 is not almost consumed, at first. That is, the tray is maintained in a standby mode. When a user turns on one of button switches in the key input unit 32, however, a normal mode of power consumption commences, and the dial tone of telephone number we are dialing is outputted, resulting in power consumption interruption.

In case the main body 30 has the built-in battery 41, the battery power Vcc is supplied to the reset terminal RST of microprocessor 42 through the condensers C1 and C2 and reset unit 44 of resistor R1. The condenser C1 of reset unit 44 serves to stabilize the operation of internal microprocessor 42. Stabilized reset voltage is applied due to the condenser C2.

The microprocessor 42 including internal memory and DTMF module therein, stores the internal memory with specific customers' telephone numbers, and outputs the dial tone in response to button switch of key input unit 32, selected by user.

In case of making a phone call by using a telephone 35, a handset 36 is hooked on to lie in the speaker hole 33 formed on the tilt projection 31 of main body 30, being held by the guider 34 positioned under the speaker hole.

Since "H" is outputting through the output terminals O1 O5 of microprocessor 42, the base of transistor TR1 of switching unit 45 is to be maintained in an "H" state via the reverse current prevention diodes D1 D4, with no power consumption.

In such a state, when a button switch S1 is turned "ON" by user while a specific customer's telephone number is selected, "H" of output terminal O1 of microprocessor 42 connected to the transverse nodes where the button switch S1 is arranged, is grounded through the resistor R2 connected to longitudinal nodes of button switch S1, while converted into the fine voltage "L". Thereafter, it passes through the reverse current prevention diode D5, before transmitted to the input terminal 11 of microprocessor 42. In this connection, it can be recognized that the button switch S1 is turned "ON".

Simultaneously with this, the transistor TR1 of switching unit 45 connected to the base via the diode D1 is turned "ON", and the transistor TR2 is serially turned "ON", causing the battery power Vcc to be applied to the reset terminal RST of microprocessor 42, to thereby be initialized.

Accordingly, the microprocessor 42 outputs a digital signal of telephone number which is stored in the specific store area of internal memory in accordance with the button switch selection of user. The digital signal is transmitted to a DTMF module, before outputted as a dial tone in response to the telephone number.

The dial tone passes by the amplifier 46, and is then outputted via speaker 47 attached to bottom of speaker hole 33, before outputted through handset 36 laid in the speaker hole 33. As a result, automatic dialing from telephone 35 can be performed.

After the lapse of 0.2 second that the dial tone is outputted, the microprocessor 42 outputs a return signal of "L" via output terminal O5, in order not to supply the power to the amplifier 46, and to initialize the power, by making the third transistor TR3 of return unit 48 turned "OFF".

Figure 5:
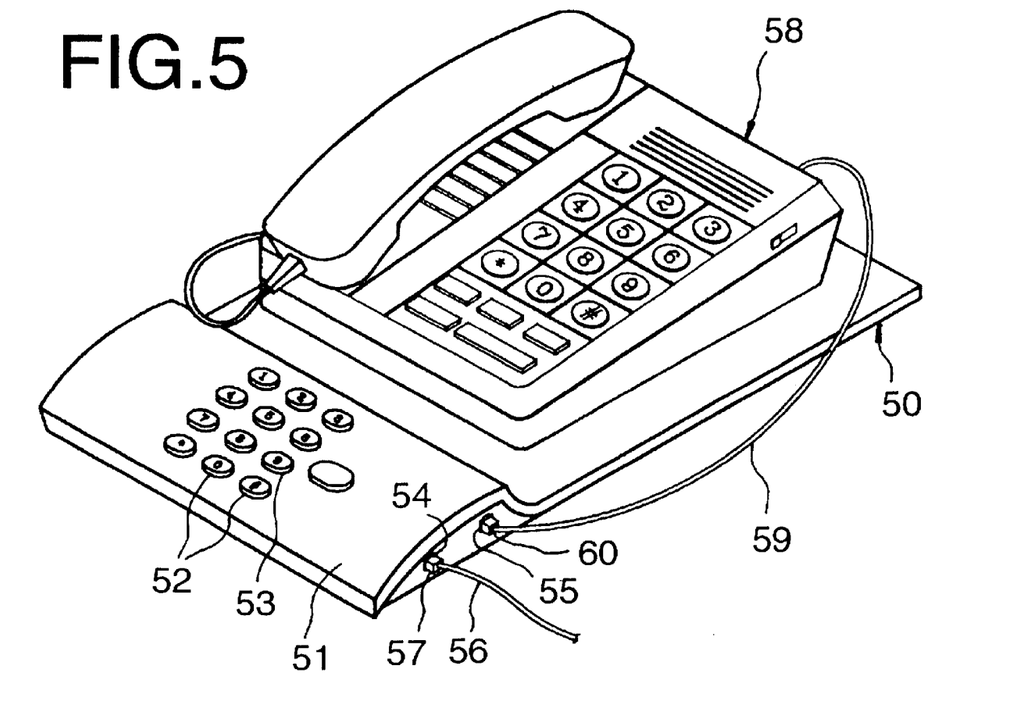
FIG. 5 is a perspective view of the telephone tray according to still another embodiment of the present invention.

FIG. 5 shows an external construction in accordance with still another embodiment of the present invention. Keys of a key input unit 53 are mounted in a plurality of key reception apertures 52 formed at one side of top of tilt projection 51 provided in a telephone tray main body 50.

Two jacks 54 and 55 are formed, side by side, at one side of the tilt projection 51, and respectively coupled with and electrically connected to a plug 57 of an external telephone line 56 and a plug 60 of a telephone line 59 of telephone 58.

Figure 6:
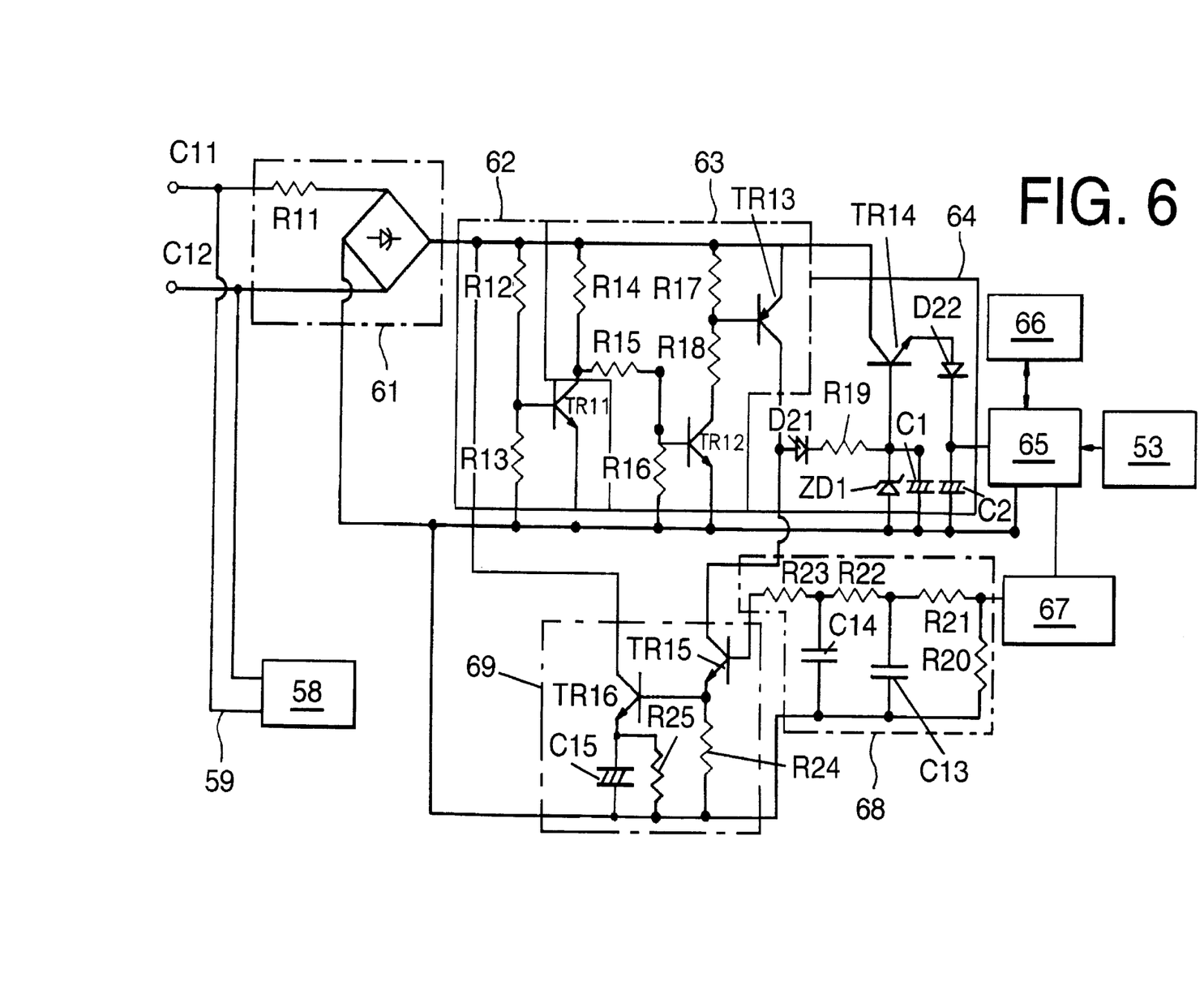
FIG. 6 is a circuit diagram depicting the internal construction of FIG. 5.

Referring to FIG. 6 which is a circuit diagram of still another embodiment of the present invention, the telephone tray includes: a rectifier 61 which is a bridge diode BD, is connected to two lines L1 and L2 of external telephone line 56, and converts an AC voltage transmitted via a resistor R1, into a DC voltage; a high voltage detector 62 for detecting whether the DC voltage transmitted via the rectifier 61 and divided by two dividing resistors R2 and R3, is applied to a first transistor TR1 as a bias voltage higher than a specific voltage; a low voltage amplifier 63 for amplifying a low voltage by applying a low voltage passing by resistors R4, R5, and R6 to a second transistor TR2, in order to make the second transistor TR2 turned "ON", and by bypassing a current passing through resistors R7 and R8, in order to make a third transistor TR3 turned "ON", in case the DC voltage is not a high voltage; a switching unit 64 for supplying an operational power Vcc to a microprocessor 65 via a diode D2, while making a fourth transistor TR4 turned "ON", in case a current passing through emitter-collector of the third transistor TR3 of the low voltage amplifier 63, is above the specific value of voltage which passes by a diode D1 and then determined by a voltage regulating diode ZD1; a microprocessor 65 which is given the operational power Vcc, and controls the operation in response to telephone numbers, after recognizing a state in which a user selects a telephone number by ten keys formed in the key input unit 53; a memory 66 for transmitting the microprocessor 65 digital information stored in an internal store area by the control of microprocessor 65; a signal generator 67 which is transmitted a square wave signal of the digital information which is outputted from the microprocessor 65, before outputting it as a sine wave signal; a filter 68 for removing a noise which is included while the sine wave signal outputted from the signal generator 67 passes by resistors R10, R11, R12 and R13, and condensers C3 and C4; and The telephone tray according to the present invention is usually employed for supporting the telephone set 58, like a conventional telephone tray. Two jacks 54 and 55 formed on the main body 51 are, respectively, coupled with and electrically connected to the plug 57 of external telephone line 56 and the plug 60 of telephone line 59 of telephone 58.

The AC voltage applied through the first resistor R1 is converted into the DC voltage, by the bridge diode BD of rectifier 61 which is connected, through the jack 54, to the lines L1 and L2 of external telephone line 56.

When the DC voltage given through the rectifier 61 is a ring signal and high voltage, the voltage divided by two dividing resistors R2 and R3 of high voltage detector 62, becomes higher than a specific voltage, and is applied, as a bias voltage, to a base of the transistor TR1 of high voltage detector 62, thereby turning on the transistor TR1.

As the transistor TR1 is turned "ON", the bias voltage applied to a base of the transistor TR2 of low voltage amplifier 63, is bypassed to be maintained in an "OFF" state, such that the operation of dialing the telephone numbers is not performed, because a phone call to the telephone 58 is made from outside while the ring signal is inputted.

Meanwhile, in case the DC voltage is not a high voltage, the voltage divided by means of two dividing resistors R2 and R3 of high voltage detector 62 is lower than a specific voltage, and cannot be applied, as a bias voltage, to the base of transistor TR1. Thus, the transistor TR1 is turned "OFF". In this connection, when the voltage divided, passing through resistors R4, R5, and R6 of low voltage amplifier 63, is a bias voltage and low voltage, the second transistor TR2 is made to be turned "ON", and the current passing through resistors R7 and R8 is bypassed via collector-emitter, in order to make the third transistor TR3 turned "ON".

The diode D1 prevents the current flowing through emitter-collector of transistor TR3 of low voltage amplifier 63 from flowing reversely. The current is applied to the voltage regulating diode ZD1. At this point, when the current is above Zener voltage of voltage regulating diode ZD1, a bias voltage is applied to a base of the transistor TR4, in order to make the transistor TR4 turned "ON". The current flowing through collector-emitter of transistor TR4, is supplied, as the operational power Vcc, to the microprocessor 65 via the diode D2.

The microprocessor 65 is given the normal, operational power Vcc, while transmitted a key signal for telephone number selection, in accordance with a user who turns on one or many of ten keys formed in the key input unit 53, except when the handset is hooked on to give a call, resulting in a voltage lower than Zener voltage of voltage regulating diode ZD1, and except when the voltage divided by two dividing resistors R2 and R3 of high voltage detector 62 is applied, as a bias voltage, to the base of transistor TR1, while a phone call is made from outside.

The microprocessor 65 to which the key signal is transmitted, reads and outputs, the square wave signal, the digital information of telephone numbers in the store area of memory 66, in response to the key signals.

The square wave signal of digital information outputted from the microprocessor 65 is converted, by the signal generator 67, into the sine wave signal, and then outputted, before its noise is removed while passing through resistors R10 R13 and condensers C3 and C4 of the filter 68.

The sine wave signal from which the noise is removed by the filter 68, is applied, as a bias voltage, to a base of the transistor TR5 of output amplifier 69, in order to make the transistor TR5 turned "ON". Here, the transistor TR6 to which the bias voltage is applied, is also turned "ON" by the current flowing through collector-emitter of the transistor TR5.

Each time the transistor TR 6 is selectively turned on by the sine wave signal, the positive voltage of bridge diode BD of rectifier 61 is bypassed by resistor R14 and collector-emitter and condenser C5 of transistor TR6, and resistor R15, resulting in value change of DC voltage of rectifier 61, such that the voltage value corresponding to dial tone is simultaneously outputted via two lines L1 and L2 of external telephone line 56, and telephone line 59 of telephone 58. Therefore, both external telephone and my own telephone get to ring.

As described above, lots of specific telephone numbers are stored in its internal memory, and when a preselected switch is turned "ON" the dial tone of telephone number that we are dialing is outputted through the speaker.

The promotional tray for automatic dial telephone of the present invention has a construction that allows the user simply and conveniently to dial in a state of storing the telephone numbers in advance, makes the button switches activated for a short period of time, to be electrically used, and makes the dial tone of telephone number outputted even though not hooked on without using a separate power supply.

It will be apparent to those skilled in the art that various modifications and variations can be made in a tray for automatic dial telephones of the present invention without departing from the spirit or scope of the invention. Thus, it is intended that the present invention cover the modifications and variations of this invention provided they come within the scope of the appended claims and their equivalents.

What is claimed is:

1. A tray for automatic dial telephones comprising:
   a main body to put a telephone set thereon;
   a dial tone unit for storing a dial tone of a specific telephone number as an electrical signal;
   a battery for supplying an operational power of the dial tone unit;
   a button switch to require an output of the dial tone; and
   a speaker for converting the electrical signal of the dial tone unit into a sound, before outputting it through a transmitter
   the transistor TR1 is turned "ON" by the microprocessor when a phone call is made from outside, and the DC voltage transmitted through the rectifier is divided by two dividing resistors R2 and R3 of the high voltage detector, or when a user picks up a handset, and the DC voltage is lower than Zener voltage of voltage regulating diode ZD1 of switching unit, passing by the transistors TR2 and TR3 of low voltage amplifier, the transistor TR4 is not turned "ON", such that a normal, operational power Vcc is not supplied, thereby avoiding the repeated use.

2. A tray for automatic dial telephones comprising a main body with a tilt projection on which a key input unit where a plurality of button switches are in matrix arrangement, is positioned, and a built-in battery which is, as an operational power, supplied to output a dial tone of telephone number, wherein:
   a battery power Vcc is supplied to a reset terminal RST of a microprocessor via condensers C1 and C2 and a reset unit of a resistor R1,
   the battery power Vcc is connected to the reset terminal RST through a condenser C3 in a switching unit including a transistor TR1 and a transistor TR2;
   output terminals O1 O4 of the microprocessor, which are commonly connected to a base of the transistor TR2 through reverse current prevention diodes D1 D4, are connected to transverse nodes of button switches S1 S7 S8 S14 S15 S21 S22 S28 of a key input unit, respectively;
   longitudinal nodes of button switches S1 S7 S8 S14 S15 S21 S22 S28 are grounded via resistors R2 R8, simultaneously passing through reverse current prevention diodes D5 D11, before connected to input terminals I1 I7 of the microprocessor, in which the microprocessor recognizes that one of button switches S1 S7 S8 S14 S15 S21 S22 S28 is turned "ON",
   the dial tone of telephone numbers outputted from the microprocessor, is outputted through a speaker, after passing by an amplifier; and
   a return signal outputted from an output terminal O5 of the microprocessor makes a transistor TR3 of a return unit turned "ON", before initializing the amplifier.

3. A tray for automatic dial telephones, with a main body where a key input unit is installed, comprising:
   a rectifier which is a bridge diode BD connected to two lines L1 and L2 of an external telephone line, for converting an inputted AC voltage into a DC voltage;
   a high voltage detector for detecting whether the DC voltage divided by two dividing resistors R2 and R3, is applied, as a bias voltage, to a transistor TR1;
   a low voltage amplifier for amplifying the DC voltage while transistors TR2 and TR3 are turned "ON" by the DC voltage passing through resistors R4, R5, and R6;
   a switching unit for supplying an operational power Vcc to a microprocessor via a diode D2, while a transistor TR4 is turned "ON" by a current passing through a diode D1 and a voltage regulating diode ZD1;
   the microprocessor which is transmitted a key signal that a user selects via the key input unit;
   a memory for outputting digital information stored therein by the control of microprocessor;
   a signal generator which is transmitted a square wave signal of the digital information which is outputted from the microprocessor, before outputting it as a sine wave signal;
   a filter for removing a noise from the sine wave signal; and an output amplifier in which transistors TR5 and TR6 are serially turned "ON" by the sine wave signal, in such a way that the value of DC voltage of rectifier is changed, thereby outputting changed voltage value corresponding to dial tone through two telephone lines simultaneously.

* * * * *